(12) United States Patent
Yang

(10) Patent No.: US 8,238,914 B2
(45) Date of Patent: Aug. 7, 2012

(54) HANDOFF METHOD, SWITCHING DEVICE AND TERMINAL

(75) Inventor: Shengqiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 40 days.

(21) Appl. No.: 12/814,280

(22) Filed: Jun. 11, 2010

(65) Prior Publication Data

US 2010/0248725 A1 Sep. 30, 2010

Related U.S. Application Data

(63) Continuation of application No. PCT/CN2008/073215, filed on Nov. 27, 2008.

(30) Foreign Application Priority Data

Dec. 13, 2007 (CN) .......................... 2007 1 0172402

(51) Int. Cl.
*H04W 88/02* (2009.01)

(52) U.S. Cl. ...................................................... 455/436

(58) Field of Classification Search ........... 455/436–444
See application file for complete search history.

(56) References Cited

U.S. PATENT DOCUMENTS

| | | | |
|---|---|---|---|
| 2004/0196810 A1* | 10/2004 | Kil et al. | 370/331 |
| 2005/0083886 A1 | 4/2005 | Ikeda | |
| 2007/0014262 A1 | 1/2007 | Gras et al. | |

FOREIGN PATENT DOCUMENTS

| | | |
|---|---|---|
| CN | 1378365 A | 11/2002 |
| CN | 1610439 A | 4/2005 |
| CN | 101052210 A | 10/2007 |
| CN | 101207925 A | 6/2008 |
| EP | 0 676 907 B1 | 6/2004 |
| WO | WO 2007/003851 A2 | 1/2007 |
| WO | WO 2009/076833 A1 | 6/2009 |

OTHER PUBLICATIONS

European Office Action, Huawei Technologies Co., Ltd., Application No. 06 840 644.6-2416, Ref. No. P36427/EP-TH/sg, Jun. 11, 2008, 6 pages.
European Office Action, Huawei Technologies Co., Ltd., Application No. 06 840 644.6-2416, Ref. No. P36427/EP-TH/sg, Oct. 23, 2009, 4 pages.
First Office Action of the State Intellectual Property Office of the PRC, PCT Application No. 200680011918.X, Apr. 29, 2010, 7 pages.

\* cited by examiner

*Primary Examiner* — Diane Mizrahi
(74) *Attorney, Agent, or Firm* — Slater & Matsil, L.L.P.

(57) ABSTRACT

A handoff method, a switching device, and a terminal are provided. A first service link is established between a first terminal and a second terminal through a switching device. The method includes the following steps. A first switching device receives a call request from the first terminal, and the first switching device sends a link establishment request to the switching device on the first service link according to the call request. A switching device and a terminal are also provided. By adopting the handoff method, the switching device, and the terminal, only the switching device on the first service link is updated to support the universal handoff logic, and there is no requirement of whether the first switching device supports the universal handoff logic. In the case that it is difficult to update all the switches one by one to support the universal handoff logic in the current network, the handoff method is simple to operate and has wide universality.

19 Claims, 3 Drawing Sheets

HANDOFF METHOD, SWITCHING DEVICE AND TERMINAL

This application is a continuation of co-pending International Application No. PCT/CN2008/073215, filed Nov. 27, 2008, which designated the United States and was not published in English, and which claims priority to Chinese Application No. 200710172402.X, filed Dec. 13, 2007, both of which applications are incorporated herein by reference.

TECHNICAL FIELD

The present invention relates to the field of communication, and more particularly to a handoff method, a switching device, and a terminal.

BACKGROUND

In a wireless cellular mobile network, a mobile station (MS) roams randomly. In a conversation process of a user, an MS moves and thus goes beyond the coverage of an originally accessed first base station (BS) and enters the coverage of a second BS, and in this case, it needs to connect the MS with the second BS through a handoff process for communication, so as to keep the conversation uninterrupted.

Currently, the wireless cellular mobile network provides two handoff technologies: hard handoff and soft handoff.

Hard handoff: when the MS moves and detects that signals of the first BS are deteriorated to a certain threshold or detects that signals of the second BS have higher intensity and quality, the MS reports to a mobile switching center (MSC). If the MSC determines that a hard handoff needs to be executed according to a certain algorithm, the MSC instructs the MS to perform the handoff to interrupt communication with the first BS and attempt to establish service connection with the second BS.

Soft handoff: in a code division multiple access (CDMA) wireless cellular mobile network, a CDMA MS is equipped with a RAKE multipath receiver similar to a rake, and supports the receiving operation via a plurality of signal paths simultaneously. When the MS moves and detects strong signals of the second BS, the MS may establish service connection with the second BS via a certain branch of the RAKE multipath receiver, without interrupting a service link with the first BS.

Both the above two handoff methods complete a handoff process between the first BS or the second BS and the MS by the cooperative work between the first BS and the second BS. When the difference of the network equipments concerned in the handoff is quite large, interoperability interfaces need to be designed on each of the associated network equipments and protocols need to be established for communication between the associated network equipments, so as to support the normal operation of the entire handoff process. If the wireless networks belong to different network systems, interoperability interfaces especially need to be designed between network equipments in the different network systems and protocols need to be established for communication between network equipments in the different network systems, so as to support the normal operation of the handoff process across networks. If a wireless network system is newly added in the future, interoperability interfaces need to be designed between network equipments in the current network system and network equipments in the newly added network system, protocols need to be established for communication between the network equipments in the current network system and the network equipments in the newly added network system, so as to support the normal operation of the handoff process between the current network system and the newly added network system. Currently, the design of such handoff is more complex, and has poor expansibility, high design difficulty, and high implementation costs.

SUMMARY OF THE INVENTION

Accordingly, embodiments of the present invention provide a handoff method, a switching device, and a terminal, which are applicable to simplify a handoff process, increase universality of the handoff process, and reduce design difficulty and implementation costs of a network.

In an embodiment, the present invention provides a handoff method, in which a first service link is established between a first terminal and a second terminal through a switching device, and the method includes the following steps.

A first switching device receives a call request from the first terminal. The call request carries office direction information of the switching device on the first service link, and a called party indicated by the call request is the second terminal.

The first switching device sends a link establishment request to the switching device on the first service link according to the call request. The link establishment request carries address information of the first terminal and the second terminal.

The switching device on the first service link establishes a link with the first switching device according to the link establishment request.

The switching device on the first service link releases a link between the switching device on the first service link and the first terminal, and connects a link between the switching device on the first service link and the second terminal with the link between the switching device on the first service link and the first switching device.

In an embodiment, the present invention further provides a switching device, which is adapted to implement a handoff if a first service link is established between a first terminal and a second terminal. The switching device includes a receiving unit and a link unit.

The receiving unit is adapted to receive a call request from the first terminal. The call request carries office direction information of the switching device on the first service link, and a called party indicated by the call request is the second terminal.

The link unit is adapted to send a link establishment request to the switching device on the first service link according to the call request received by the receiving unit. The link establishment request carries address information of the first terminal and the second terminal.

In an embodiment, the present invention further provides a switching device, which is adapted to implement a handoff if a first service link is established between a first terminal and a second terminal. The switching device includes a receiving unit, a link unit, a checking unit, and a handoff unit.

The receiving unit is adapted to receive a link establishment request from a first switching device. The link establishment request carries address information of the first terminal and the second terminal.

The link unit is adapted to establish a link between the switching device and the first switching device according to the link establishment request received by the receiving unit.

The checking unit is adapted to check a connection relation table according to the address information of the first terminal and the second terminal in the link establishment request received by the receiving unit.

The handoff unit is adapted to release a link between the switching device on the first service link and the first terminal, and connect a link between the switching device and the second terminal with the link between the switching device and the first switching device established by the link unit, when the checking unit finds that the first service link is established between the first terminal and the second terminal.

In an embodiment, the present invention further provides a terminal, which is adapted to implement a handoff if a first service link is established between the terminal and a peer end. The terminal includes a receiving unit, a determining unit, and a sending unit.

The receiving unit is adapted to receive office direction information of the switching device on the first service link.

The determining unit is adapted to determine whether a handoff needs to be initiated.

The sending unit is adapted to send a call request to a first switching device when the determining unit determines that the handoff needs to be initiated. The call request carries the office direction information of the switching device on the first service link received by the receiving unit, and a called party indicated by the call request is the peer end.

By using the handoff method, the switching device, and the terminal provided according to embodiments of the present invention, when the first service link is established between the first terminal and the second terminal through a switching device, the first terminal further initiates a call request, and a called party indicated by the call request is the second terminal, so that the call in fact refers to a handoff. The first switching device routes the call to the switching device on the first service link according to the office direction information of the switching device on the first service link carried in the call request. On the condition that the link between the first switching device and the switching device on the first service link is established, the switching device on the first service link releases the link between the switching device on the first service link and the first terminal, and connects the link between the switching device on the first service link and the second terminal with the link between the switching device on the first service link and the first switching device. In this way, only the switching device on the first service link needs to be updated to support universal handoff logic, without requiring the first switching device to support the universal handoff logic. In the case that it is difficult to update all the switching devices in the current network one by one to support the universal handoff logic, the handoff technology provided by embodiments of the present invention is simple to operate and has wide universality, which is suitable for the handoff within various wireless network systems and the handoff between different wireless network systems, and, furthermore, reducing the design difficulty and the implementation costs of the network.

DETAILED DESCRIPTION OF ILLUSTRATIVE EMBODIMENTS

Figure 1:
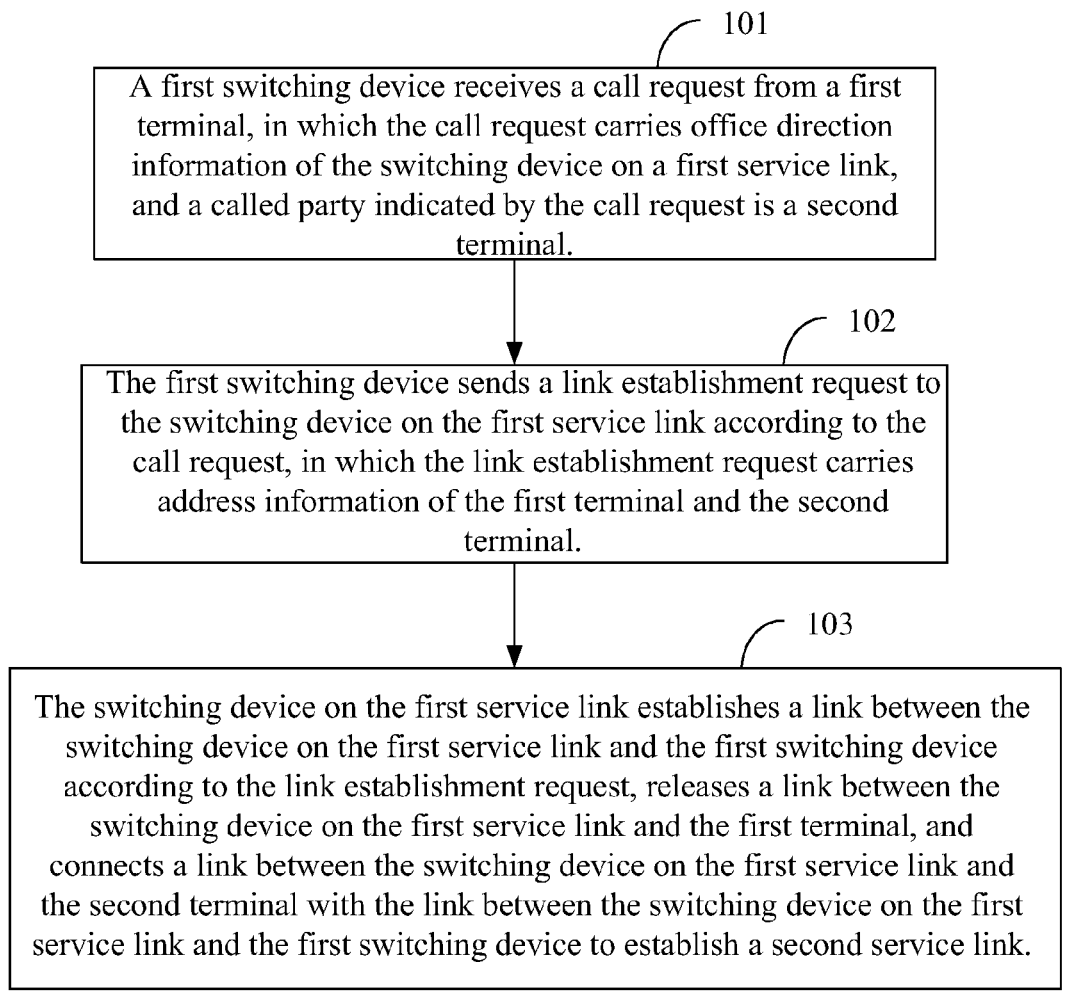
FIG. 1 is a schematic diagram of a handoff process according to a first embodiment of the present invention.

Embodiments of the present invention are illustrated in detail hereinafter.

Before introducing the detailed solutions, two terms are introduced at first.

Office direction information: as for one particular switching device, the office direction information is information for positioning the switching device, and is unique in an entire network, which may be identification (ID) of the switching device or an Internet protocol (IP) address of the switching device.

Universal handoff logic: as for one particular switching device, which supports the universal handoff logic if the following functions are supported, that is, checking a link relation table according to addresses of a calling terminal and a called terminal; when it is checked that a service link is established between the calling terminal and the called terminal, releasing the original service link between the switching device and the calling party or the original service link between the switching device and the called party, and enabling a new service link between the switching device and the calling party or the switching device and the called party.

In a first embodiment, a handoff method is provided. A first terminal establishes a conversation with a second terminal through a first BS, and a conversation link established between the first terminal and the second terminal is a first service link.

After the first service link is established, if a switching device on the first service link supports the universal handoff logic, the switching device sends office direction information of the switching device to the first terminal through an office direction notification message. The office direction notification message may be either an in-band message or an out-band message. The switching device on the first service link may also send the office direction information of the switching device to the second terminal through an office direction notification message. The storage of the office direction information by the second terminal and the manner of initiating a handoff by the second terminal are similar with the first terminal. The embodiment takes the first terminal for an example.

When the switching device on the first service link sends the office direction information of itself to the first terminal, the first terminal stores the office direction information of the switching device on the first service link. The first terminal may store the office direction information in the following manner.

1. If only one switching device on the first service link supports the universal handoff logic, the first terminal stores office direction information of the switching device.

2. If a plurality of switching devices on the first service link supports the universal handoff logic, the first terminal may store office direction information of only one switching device, or store office direction information of more than one switching device.

If a plurality of switching devices supports the universal handoff logic, the first terminal may store office direction information of one switching device in the following manners.

The first terminal stores latest arrived office direction information of the switching device on the first service link in one conversation or handoff process.

Alternatively, the first terminal stores earliest arrived office direction information of the switching device on the first service link in one conversation or handoff process.

Alternatively, in a configuration process of the first terminal, the first terminal is configured an office direction information storage rule. The first terminal stores office direction information of the switching device on the first service link according to the office direction information storage rule.

When a plurality of switching devices supports the universal handoff logic, the first terminal may store office direction information of more than one switching device in the following manners.

The first terminal sequentially stores office direction information of the switching devices on the first service link based on an arrived order of the office direction information of the switching devices on the first service link in one conversation or handoff process.

Alternatively, the first terminal stores office direction information of the switching devices on the first service link in reverse order with respect to an arrived order of the office direction information of the switching devices on the first service link in one conversation or handoff process.

Alternatively, in a configuration process of the first terminal, the first terminal is configured an office direction information storage rule. The first terminal stores the office direction information of the switching devices on the first service link according to the order specified in the office direction information storage rule.

During a conversation with the second terminal, the first terminal moves to a second BS. If it is determined that a handoff is needed, the first terminal initiates a new call to the second BS.

Figure 2:
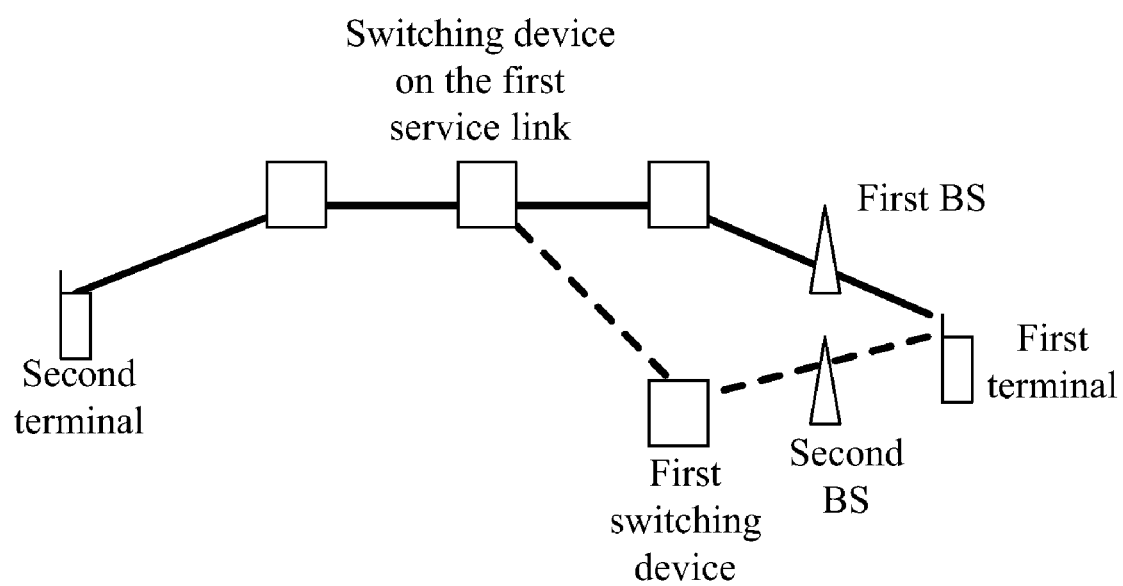
FIG. 2 is a schematic diagram of device connection of a method according to a first embodiment of the present invention.

FIG. 1 is a schematic diagram of a handoff process according to a first embodiment of the present invention. FIG. 2 is a schematic diagram of device connection of a method according to the first embodiment of the present invention.

For ease of description, a service link represented by a solid line from the second terminal to the switching device on the first service link in FIG. 2 is referred to as a first segment service link, a service link represented by a solid line between the switching device on the first service link and the first terminal is referred to as a second segment service link, and a service link represented by a dashed line between the switching device on the first service link and the first terminal is referred to as a third segment service link. In FIG. 2, the first service link includes the first segment service link and the second segment service link, and a second service link includes the first segment service link and the third segment service link.

In Step 101, a first switching device of a network where the second BS is located receives a call request from the first terminal. The call request carries office direction information of the switching device on the first service link, and a called party indicated by the call request is the second terminal.

The call request may carry office direction information of only one switching device on the first service link, and may carry office direction information of two or more switching devices on the first service link.

In Step 102, the first switching device sends a link establishment request to the switching device on the first service link according to the call request, wherein the link establishment request carries address information of the first terminal and the second terminal.

According to this method embodiment of the present invention, the sending the link establishment request to the switching device on the first service link includes the following circumstances.

If the call request carries office direction information of only one switching device on the first service link, the first switching device sends a link establishment request to the switching device on the first service link corresponding to the office direction information. If the link establishment succeeds, step 103 is executed. If the link establishment fails, the first switching device rejects this call and terminates the handoff of the first terminal.

Alternatively, if the link establishment succeeds, and the first switching device supports the universal handoff logic, the first switching device sends office direction information of the first switching device itself to the first terminal for being buffered by the first terminal, which is provided for being subsequently used when the first terminal initiates a handoff.

If the call request carries office direction information of more than one switching device on the first service link, the first switching device sends a link establishment request to the switching device corresponding to first office direction information in the call request. If the link establishment fails, the first switching device further sends a link establishment request to the switching device corresponding to next office direction information in the call request, until the link establishment succeeds, and step 103 is executed. If the link establishment finally fails, the first switching device rejects this call and terminates the handoff of the first terminal.

If the link establishment finally fails, the first switching device further establishes a link based on an ordinary call mode according to a destination address of the second terminal, and the process ends.

In Step 103, the switching device on the first service link establishes a link between the switching device on the first service link and the first switching device according to the link establishment request, releases a link between the switching device on the first service link and the first terminal, and connects a link between the switching device on the first service link and the second terminal with the link between the switching device on the first service link and the first switching device to establish a second service link.

Alternatively, after the switching device on the first service link has established the second service link, the switching device on the first service link sends the office direction information of the switching device itself to the first terminal for being buffered by the first terminal, which is provided for being used subsequently when the first terminal initiates a handoff.

The first terminal processes the buffered office direction information of the first switching device and new office direction information of the switching device on the first service link in the following manner.

After the first terminal has released the link with the switching device on the first service link, or the first terminal has received a handoff complete indication, the first terminal stores the office direction information of the first switching device, and overwrites the office direction information of the switching device on the first service link originally stored in the first terminal by the new office direction information of the switching device on the first service link.

The first terminal further clears office direction information of other devices on the first service link between the first terminal and the switching device on the first service link.

In a second embodiment, a switching device is adapted to implement a handoff if a first service link is established between a first terminal and a second terminal.

Figure 3:
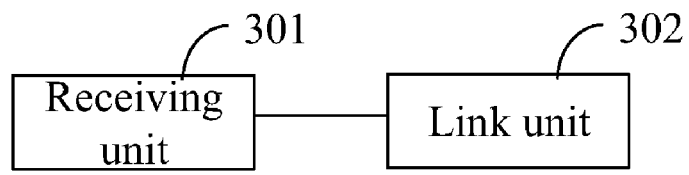
FIG. 3 is a schematic structural view of a switching device according to a second embodiment of the present invention.

FIG. 3 is a schematic structural view of a switching device according to a second embodiment of the present invention.

The receiving unit 301 is adapted to receive a call request from the first terminal. The call request carries office direction information of a switching device on the first service link, and a called party indicated by the call request is the second terminal.

The link unit 302 is adapted to send a link establishment request to the switching device on the first service link according to the call request received by the receiving unit. The link establishment request carries address information of the first terminal and the second terminal.

The call request carries office direction information of a plurality of switching devices on the first service link. Furthermore, the link unit includes a sending subunit, a determining subunit, and a control subunit.

The sending subunit is adapted to send the link establishment request to the switching device on the first service link corresponding to the office direction information according to the call request.

The determining subunit is adapted to determine whether link establishment succeeds after the sending subunit sends the link establishment request.

The control subunit is adapted to generate a control instruction if the determining subunit determines that the link establishment fails. The control instruction is adapted to control the sending subunit to send a link establishment request to the switching device on the first service link corresponding to next office direction information, until the link establishment succeeds.

The switching device further includes a sending unit.

The sending unit is adapted to send office direction information of the switching device to the first terminal, if the switching device supports universal handoff logic.

Alternatively, the sending unit is adapted to send office direction information of the switching device to the second terminal, if the switching device supports universal handoff logic.

In a third embodiment, a switching device is adapted to implement a handoff if a first service link is established between a first terminal and a second terminal.

Figure 4:
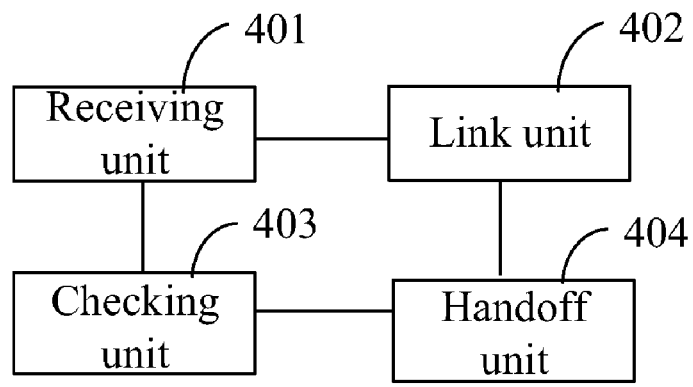
FIG. 4 is a schematic structural view of a switching device according to a third embodiment of the present invention.

FIG. 4 is a schematic structural view of a switching device according to a third embodiment of the present invention.

A receiving unit 401 is adapted to receive a link establishment request from a first switching device. The link establishment request carries address information of the first terminal and the second terminal.

A link unit 402 is adapted to establish a link between the switching device and the first switching device according to the link establishment request received by the receiving unit.

A checking unit 403 is adapted to check a connection relation table according to the address information of the first terminal and the second terminal in the link establishment request received by the receiving unit.

A handoff unit 404 is adapted to release a link between the switching device on the first service link and the first terminal, and connect a link between the switching device and the second terminal with the link between the switching device and the first switching device established by the link unit according to the link between the switching device and the first switching device established by the link unit, if the checking unit finds that the first service link is established between the first terminal and the second terminal.

Furthermore, the switching device further includes a first sending unit.

The first sending unit is adapted to send office direction information of the switching device to the first terminal after the handoff unit implements handoff from the first service link to a second service link.

Furthermore, the switching device further includes a second sending unit.

The second sending unit is adapted to send office direction information of the switching device to the second terminal after the handoff unit implements handoff from the first service link to a second service link.

In a fourth embodiment, a terminal is adapted to implement a handoff if a first service link is established between the terminal and a peer end.

Figure 5:
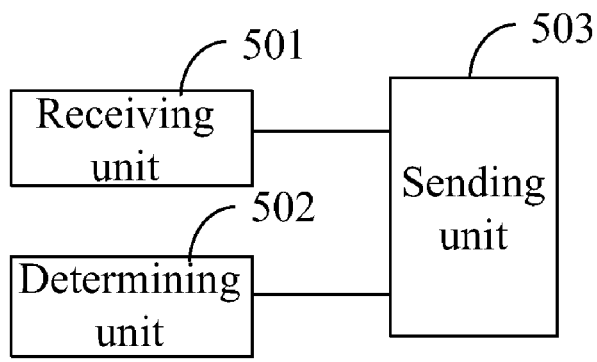
FIG. 5 is a schematic structural view of a terminal according to a fourth embodiment of the present invention.

FIG. 5 is a schematic structural view of a terminal according to a fourth embodiment of the present invention.

A receiving unit 501 is adapted to receive office direction information of a switching device on the first service link.

A determining unit 502 is adapted to determine whether a handoff needs to be initiated.

A sending unit 503 is adapted to send a call request to a first switching device if the determining unit determines that the handoff needs to be initiated. The call request carries the office direction information of the switching device on the first service link received by the receiving unit, and a called party indicated by the call request is the peer end.

Furthermore, the receiving unit includes a receiving subunit and a storing subunit.

The receiving subunit is adapted to receive the office direction information of the switching device on the first service link.

The storing subunit is adapted to store latest arrived office direction information of the switching device on the first service link in one conversation or handoff process.

Alternatively, the storing subunit is adapted to store earliest arrived office direction information of the switching device on the first service link in one conversation or handoff process.

Alternatively, the storing subunit is adapted to sequentially store office direction information of switching devices on the first service link based on an arrived order of the office direction information of the switching devices on the first service link in one conversation or handoff process.

Alternatively, the storing subunit is adapted to store office direction information of switching devices on the first service link in reverse order with respect to an arrived order of the office direction information of the switching devices on the first service link in one conversation or handoff process.

Through the descriptions of the preceding embodiments, those skilled in the art may understand that the present invention may be implemented by hardware only or by software and a universal hardware platform. However, in most cases, using software and a universal hardware platform are preferred. Based on such understandings, all or part of the technical solutions under the present invention that make contributions to the prior art may be essentially embodied in the form of a software product. The software product may be stored in a storage medium, which can be a magnetic disk, a Compact Disk Read-Only Memory (CD-ROM), a Read-Only Memory (ROM) or a Random Access Memory (RAM). The software product includes multiple instructions that enable a computer device (personal computer, server, or network device) to execute the methods provided in the embodiments of the present invention.

It should be noted that the above descriptions are merely preferred embodiments of the present invention, and person having ordinary skill in the art may make various improvements and refinements without departing from the scope of the invention. All such modifications and refinements are intended to be covered by the present invention.

What is claimed is:

1. A handoff method, wherein a first service link is established between a first terminal and a second terminal through a switching device, the method comprising:
   receiving, by a first switching device, a call request from the first terminal, wherein the call request carries office direction information of the switching device on the first service link, and a called party indicated by the call request is the second terminal;
   sending, by the first switching device, a link establishment request to the switching device on the first service link according to the call request, wherein the link establishment request carries address information of the first terminal and the second terminal;
   establishing, by the switching device on the first service link, a link between the switching device on the first service link and the first switching device according to the link establishment request; and
   releasing, by the switching device on the first service link, a link between the switching device on the first service link and the first terminal, and connecting a link between the switching device on the first service link and the second terminal with the link between the switching device on the first service link and the first switching device.

2. The handoff method according to claim 1, wherein there is at least one switching device on the first service link, and the call request carries office direction information of the at least one switching device on the first service link.

3. The handoff method according to claim 2, wherein when there are more than one switching device on the first service link, the sending the link establishment request to the switching device on the first service link comprises:
   sending, by the first switching device, the link establishment request to the switching device on the first service link corresponding to the first office direction information in the call request; and
   when link establishment fails, sending, by the first switching device, the link establishment request to the switching device on the first service link corresponding to a next office direction information in the call request, until the link establishment succeeds.

4. The handoff method according to claim 1, further comprising:
   sending, by the first switching device, office direction information of the first switching device to the first terminal or the second terminal, when the first switching device supports universal handoff logic.

5. The handoff method according to claim 1, further comprising:
   sending, by the switching device on the first service link, the office direction information of the switching device on the first service link to the first terminal or the second terminal, when the switching device on the first service link supports universal handoff logic.

6. The handoff method according to claim 1, wherein after connecting a link between the switching device on the first service link and the second terminal with the link between the switching device on the first service link and the first switching device, the method further comprises:
   sending, by the switching device on the first service link, the office direction information of the switching device on the first service link to the first terminal.

7. The handoff method according to claim 1, wherein after connecting a link between the switching device on the first service link and the second terminal with the link between the switching device on the first service link and the first switching device, the method further comprises:
   sending, by the switching device on the first service link, the office direction information of the switching device on the first service link to the second terminal.

8. The handoff method according to claim 1, wherein the office direction information is address information and is unique in an entire network.

9. A switching device that comprises a computer device with memory, the switching device applicable to implement a handoff when a first service link is established between a first terminal and a second terminal, the switching device comprising:
   a receiving unit adapted to receive a call request from the first terminal, wherein the call request carries office direction information of a switching device on the first service link, and a called party indicated by the call request is the second terminal; and
   a link unit adapted to send a link establishment request to the switching device on the first service link according to the call request received by the receiving unit, wherein the link establishment request carries address information of the first terminal and the second terminal.

10. The switching device according to claim 9, wherein the call request carries office direction information of at least one switching device on the first service link, and the link unit comprises:
    a sending subunit adapted to send a link establishment request to the switching device on the first service link corresponding to the office direction information according to the call request;
    a determining subunit adapted to determine whether link establishment succeeds after the sending subunit sends the link establishment request; and
    a control subunit adapted to generate a control instruction, when the determining subunit determines that the link establishment fails, wherein the control instruction is adapted to control the sending subunit to send a link establishment request to switching device on the first service link corresponding to a next office direction information, until the link establishment succeeds.

11. The switching device according to claim 9, further comprising a sending unit adapted to:
    send office direction information of the switching device to the first terminal, when the switching device supports universal handoff logic; or
    send the office direction information of the switching device to the second terminal, when the switching device supports the universal handoff logic.

12. A switching device that comprises a computer device with memory, the switching device applicable to implement a handoff when a first service link is established between a first terminal and a second terminal, the switching device comprising:
    a receiving unit adapted to receive a link establishment request from a first switching device, wherein the link establishment request carries address information of the first terminal and the second terminal;
    a link unit adapted to establish a link between the switching device and the first switching device according to the link establishment request received by the receiving unit;

a checking unit adapted to check a connection relation table according to the address information of the first terminal and the second terminal in the link establishment request received by the receiving unit; and a handoff unit adapted to release a link between the switching device and the first terminal, and connect a link between the switching device and the second terminal with the link between the switching device and the first switching device established by the link unit, when the checking unit finds that the first service link is established between the first terminal and the second terminal.

13. The switching device according to claim 12, further comprising:

a first sending unit adapted to send office direction information of the switching device to the first terminal, after the handoff unit implements handoff from the first service link to a second service link.

14. The switching device according to claim 12, further comprising:

a second sending unit adapted to send office direction information of the switching device to the second terminal, after the handoff unit implements handoff the first service link to a second service link.

15. A terminal that includes a device with memory, the terminal applicable to implement a handoff when a first service link is established between the terminal and a peer end, the terminal comprising:

a receiving unit adapted to receive office direction information of a switching device on the first service link;

a determining unit adapted to determine whether a handoff needs to be initiated; and a sending unit adapted to send a call request to a first switching device when the determining unit determines that the handoff needs to be initiated, wherein the call request carries the office direction information of the switching device on the first service link received by the receiving unit, and a called party indicated by the call request is the peer end.

16. The terminal according to claim 15, wherein the receiving unit comprises:

a receiving subunit adapted to receive the office direction information of the switching device on the first service link; and a storing subunit adapted to store latest arrived office direction information of the switching device on the first service link in one conversation or handoff process.

17. The terminal according to claim 15, wherein the receiving unit comprises:

a receiving subunit adapted to receive the office direction information of the switching device on the first service link; and a storing subunit adapted to store earliest arrived office direction information of the switching device on the first service link in one conversation or handoff process.

18. The terminal according to claim 15, wherein the receiving unit comprises:

a receiving subunit adapted to receive the office direction information of the switching device on the first service link; and a storing subunit adapted to sequentially store office direction information of switching devices on the first service link according to an arrived order of the office direction information of the switching devices on the first service link in one conversation or handoff process.

19. The terminal according to claim 15, wherein the receiving unit comprises:

a receiving subunit adapted to receive the office direction information of the switching device on the first service link; and a storing subunit adapted to store office direction information of switching devices on the first service link in reverse order with respect to an arrived order of the office direction information of the switching devices on the first service link in one conversation or handoff process.

* * * * *